United States Patent
Saario et al.

(10) Patent No.: US 9,770,847 B2
(45) Date of Patent: Sep. 26, 2017

(54) METHOD OF MANUFACTURING A SEPARATION FENCE AND SEPARATION FENCE

(71) Applicant: OUTOTEC (FINLAND) OY, Espoo (FI)

(72) Inventors: Rami Saario, Espoo (FI); Henri Fredriksson, Helsinki (FI)

(73) Assignee: Outotec (Finland) Oy, Espoo (FI)

( * ) Notice: Subject to any disclaimer, the term of this patent is extended or adjusted under 35 U.S.C. 154(b) by 420 days.

(21) Appl. No.: 14/408,398

(22) PCT Filed: Jun. 12, 2013

(86) PCT No.: PCT/FI2013/050636
§ 371 (c)(1),
(2) Date: Dec. 16, 2014

(87) PCT Pub. No.: WO2014/001618
PCT Pub. Date: Jan. 3, 2014

(65) Prior Publication Data
US 2015/0151460 A1    Jun. 4, 2015

(30) Foreign Application Priority Data
Jun. 26, 2012 (FI) ..................... 20125716

(51) Int. Cl.
*B29C 39/08* (2006.01)
*B29C 41/06* (2006.01)
(Continued)

(52) U.S. Cl.
CPC .............. *B29C 39/08* (2013.01); *B01D 11/04* (2013.01); *B01D 21/2427* (2013.01); *B29C 33/38* (2013.01); *B29C 41/06* (2013.01)

(58) Field of Classification Search
CPC . B01D 11/04; B01D 11/0446; B01D 11/0449; B01D 11/0453; B01D 11/0457;
(Continued)

(56) References Cited

U.S. PATENT DOCUMENTS 2,258,982 A    12/1938  Gordon et al.
2,728,457 A    12/1955  Clarke
(Continued)

FOREIGN PATENT DOCUMENTS

CN    1216932 A    5/1999
CN    1216933 A    5/1999
(Continued)

OTHER PUBLICATIONS

Canadian Intellectual Property Office; Office Action issued in Application No. 2,875,939; dated Sep. 15, 2015; 4 pgs.; Montreal, Quebec, Canada.
(Continued)

*Primary Examiner* — Joseph Drodge
(74) *Attorney, Agent, or Firm* — Chernoff, Vilhauer, McClung & Stenzel LLP

(57) ABSTRACT

In a method for fabricating a separation fence (1) to be used in a hydrometallurgical liquid-liquid solvent extraction settler, the fence is manufactured of polymer resin. The fence (1) is manufactured as a shell-like integral piece by rotational molding. The fence (1) is a rotationally molded shell-like integral piece.

11 Claims, 2 Drawing Sheets

(51) Int. Cl.
    *B01D 11/04*        (2006.01)
    *B01D 21/24*        (2006.01)
    *B29C 33/38*      (2006.01)

(58) Field of Classification Search
    CPC .. B01D 21/00; B01D 21/0003; B01D 21/003;
        B01D 21/0033; B01D 21/0036; B01D
        21/0039; B01D 21/0042; B01D 21/0045;
        B01D 21/01; B01D 21/02; B01D 21/08;
        B01D 21/24; B01D 21/2427; B01D
        21/244428; B01D 17/0211; B01D
        17/0214; B29C 39/04; B29C 39/08; B29C
        39/38; B29C 39/44; B29C 33/00; B29C
        33/38; B29C 41/04; B29C 41/06; B29C
        43/04; B29C 43/06; B29C 2043/043;
        B29C 65/00; B29C 65/002; B29C 65/02;
        B29C 65/022; B65D 88/022; B65D
        88/027; B65D 88/12; B65D 88/121;
        B65D 88/128; B65D 90/143; B65D 7/00;
        B65D 11/00; Y10T 29/49826
    USPC .... 210/511, 513, 521, 522, 532.1, 534, 538,
        210/540, 634, 519, DIG. 5; 220/4.01,
        220/4.12, 4.21, 4.24, 4.26, 4.27, 565;
        264/239, 241, 250, 310–312; 366/131,
        366/136, 184, 189, 192, 336, 341, 348,
        366/349; 414/800, 801, 802, 809, 787;
        425/425, 429, 434, 435
    See application file for complete search history.

(56) References Cited

U.S. PATENT DOCUMENTS

| | | | |
|---|---|---|---|
| 2,868,384 A | 1/1959 | Puddington | |
| 3,419,145 A | 12/1968 | De Celis | |
| 3,544,079 A | 12/1970 | Dressler | |
| 4,218,311 A * | 8/1980 | Newrick | B01D 11/0457 210/311 |
| 4,294,702 A | 10/1981 | Finsterwalder | |
| 4,476,018 A | 10/1984 | White et al. | |
| 4,656,067 A | 4/1987 | Yetter | |
| 4,747,948 A | 5/1988 | North | |
| 5,103,641 A | 4/1992 | Maus et al. | |
| 5,185,081 A | 2/1993 | Nyman et al. | |
| 5,266,191 A | 11/1993 | Greene et al. | |
| 5,435,924 A | 7/1995 | Albertson | |
| 5,552,050 A | 9/1996 | Valentin | |
| 5,558,780 A | 9/1996 | Vancas | |
| 5,585,008 A | 12/1996 | Ilg et al. | |
| 5,611,453 A * | 3/1997 | Schwartz | B65D 90/022 220/62.19 |
| 5,632,925 A * | 5/1997 | Moulton | B29C 33/02 249/115 |
| 5,662,861 A | 9/1997 | Taylor | |
| 5,662,871 A | 9/1997 | Nyman et al. | |
| 6,083,400 A | 7/2000 | Nyman et al. | |
| 6,132,615 A | 10/2000 | Nyman et al. | |
| 6,176,608 B1 | 1/2001 | Nyman et al. | |
| 6,245,243 B1 | 6/2001 | Meurer | |
| 6,267,900 B1 | 7/2001 | Nyman et al. | |
| 6,350,354 B1 * | 2/2002 | Neuman | C22B 3/0005 204/233 |
| 6,432,370 B1 | 8/2002 | Nyman et al. | |
| 6,558,558 B1 | 5/2003 | Hall | |
| 6,569,339 B1 * | 5/2003 | Laitala | B01D 11/0457 210/511 |
| 6,977,038 B2 * | 12/2005 | Jowett | C02F 3/04 210/151 |
| 7,390,420 B2 | 6/2008 | Nyman et al. | |
| 7,507,343 B2 * | 3/2009 | San Lorenzo | B01D 11/0449 210/511 |
| 7,517,461 B2 | 4/2009 | Nyman et al. | |
| 7,611,635 B2 | 11/2009 | Chieng et al. | |
| 7,731,853 B2 | 6/2010 | Ekman et al. | |
| 7,984,819 B1 * | 7/2011 | Davis | B65D 88/524 220/1.5 |
| 8,142,666 B1 * | 3/2012 | Happel | B01D 21/003 210/170.03 |
| 2002/0020252 A1 * | 2/2002 | Dorlac | B01D 17/0214 75/714 |
| 2004/0096608 A1 | 5/2004 | King et al. | |
| 2005/0040106 A1 | 2/2005 | Gigas et al. | |
| 2006/0113240 A1 * | 6/2006 | Burrows | B01D 35/153 210/420 |
| 2006/0113246 A1 * | 6/2006 | Ekman | B01D 11/0446 210/634 |
| 2007/0246418 A1 * | 10/2007 | Lyyra | B01D 11/0453 210/251 |
| 2007/0263486 A1 | 11/2007 | Suhner | |
| 2007/0292325 A1 * | 12/2007 | Rojas | C22B 3/0005 423/8 |
| 2009/0039092 A1 * | 2/2009 | Huang | B63B 25/004 220/694 |
| 2009/0104504 A1 | 4/2009 | Roussin-Bouchard et al. | |
| 2010/0051548 A1 | 3/2010 | Dorlac et al. | |
| 2011/0109073 A1 * | 5/2011 | Williams | B60P 3/2215 280/836 |
| 2011/0236152 A1 | 9/2011 | Lu et al. | |
| 2011/0297606 A1 | 12/2011 | Vaarno | |
| 2011/0297675 A1 * | 12/2011 | Johnson | B60P 3/14 220/8 |
| 2011/0303619 A1 | 12/2011 | Nyman et al. | |
| 2012/0085706 A1 * | 4/2012 | Bryce | B01D 11/0457 210/643 |
| 2012/0085756 A1 * | 4/2012 | Beitler | B65D 88/128 220/1.5 |
| 2012/0171006 A1 * | 7/2012 | Berry | G06Q 10/06 414/800 |
| 2012/0292252 A1 * | 11/2012 | Chase | B01D 46/003 210/634 |
| 2013/0153518 A1 * | 6/2013 | Richardson | B01D 11/0453 210/800 |
| 2014/0110359 A1 | 4/2014 | Haywood et al. | |
| 2015/0151218 A1 | 6/2015 | Vaarno et al. | |
| 2015/0151460 A1 | 6/2015 | Saario et al. | |
| 2015/0159236 A1 | 6/2015 | Vaarno et al. | |
| 2015/0182874 A1 | 7/2015 | Vaarno et al. | |
| 2015/0190732 A1 | 7/2015 | Vaarno et al. | |
| 2015/0190734 A1 | 7/2015 | Vaarno et al. | |
| 2015/0232960 A1 | 8/2015 | Vaarno et al. | |
| 2016/0130681 A1 | 5/2016 | Vaarno et al. | |

FOREIGN PATENT DOCUMENTS

| | | |
|---|---|---|
| CN | 2480439 Y | 3/2002 |
| CN | 1652853 A | 8/2005 |
| CN | 1652855 A | 8/2005 |
| CN | 2748146 Y | 12/2005 |
| CN | 1805773 A | 7/2006 |
| CN | 201071566 Y | 6/2008 |
| CN | 201082367 Y | 7/2008 |
| CN | 101449012 B | 6/2009 |
| CN | 201366254 Y | 12/2009 |
| CN | 102292133 A | 12/2011 |
| CN | 202128943 Y | 2/2012 |
| DE | 3231164 A1 | 2/1984 |
| DE | 3704326 A1 | 8/1988 |
| EP | 0126248 | 11/1984 |
| EP | 0156699 A1 | 10/1985 |
| EP | 0175191 | 3/1986 |
| EP | 0430248 | 6/1991 |
| EP | 0973595 B1 | 9/2001 |
| EP | 1566208 A1 | 8/2005 |
| EP | 2019890 A1 | 2/2009 |
| EP | 2114548 A2 | 11/2011 |
| GB | 835912 | 5/1960 |
| GB | 2341340 | 3/2000 |
| GB | 2476102 A | 6/2011 |
| JP | 2001-29703 A | 2/2001 |

(56) References Cited

FOREIGN PATENT DOCUMENTS

| JP | 2001029703 | 2/2001 |
|---|---|---|
| NO | NO20015454 A | 11/2006 |
| WO | 9740899 | 11/1997 |
| WO | 9740900 | 11/1997 |
| WO | 9740901 A1 | 11/1997 |
| WO | 9741938 | 11/1997 |
| WO | 0074895 A1 | 12/2000 |
| WO | 03097207 A1 | 11/2003 |
| WO | 2007135221 A1 | 11/2007 |
| WO | 2008094151 A1 | 8/2008 |
| WO | 2009004321 A2 | 1/2009 |
| WO | 2009063128 A1 | 5/2009 |
| WO | 2010089462 A1 | 8/2010 |
| WO | 2010097516 A1 | 9/2010 |
| WO | 2010131982 A2 | 11/2010 |
| WO | 2011113110 A1 | 6/2011 |
| WO | 2011088516 A1 | 7/2011 |
| WO | 2012026345 A1 | 3/2012 |

OTHER PUBLICATIONS

European Patent Office, Extended European Search Report issued in application No. 13808497, dated Feb. 11, 2016, 9 pages, European Patent Office, Munich, Germany.
European Patent Office, Extended European Search Report issued in application No. 13810173.8, dated Mar. 17, 2016, Munich, Germany.
European Patent Office; Extended European Search Report issued in application No. 13810718.0; dated Mar. 7, 2016; 6 pages; Munich, Germany.
European Patent Office; Extended European Search Report issued in application No. 13809503.9; dated Mar. 17, 2016; 6 pages; Munich, Germany.
European Patent Office; Partial Supplementary European Search Report issued in application No. 13810326.2; dated Apr. 25, 2016; 6 pages; Munich, Germany.
Finnish Search report from priority Finnish Application No. 20125712, dated Apr. 8, 2013, 1 pg.
Finnish Search report from priority Finnish Application No. 20125714, dated Apr. 8, 2013., 1 pg.
Finnish Search report from priority Finnish Application No. 20125715, dated Apr. 16, 2013, 1 pg.
Finnish Search report from priority Finnish Application No. 20125717, dated Apr. 19, 2013, 1 pg.
Finnish Search report from priority Finnish Application No. 20125718, dated Apr. 19, 2013, 1 pg.
Finnish Patent and Registration Office, Opinion on Patentability issued in Application No. 20125714, dated Jan. 21, 2016, Helsinki, Finland.
International Bureau of WIPO, International Preliminary Report on Patentability issued in application No. PCT/FI2013/050640, dated Dec. 31, 2014, Geneva, Switzerland.
International Searching Authority of WIPO, Written Opinion of the International Searching Authority issued in application No. PCT/FI2013/050640, dated Sep. 20, 2013, Geneva, Switzerland.
International Bureau of WIPO, International Preliminary Report on Patentability w/ attached Written Opinion of the International Searching Authority issued in pending PCT application No. PCT/FI2013/050641, dated Dec. 31, 2014, 7 pages, World Intellectual Property Organization Geneva, Switzerland.
International Bureau of WIPO, International Preliminary Report on Patentability w/ attached Written Opinion of the International Searching Authority, issued in pending PCT application PCT/FI2013/050638, dated Dec. 31, 2014, 6 pages, World Intellectual Property Organization, Geneva, Switzerland.
International Search report from corresponding International Application No. PCT/FI2013/050637, dated Oct. 9, 2013, 3 pgs.

International Search report from corresponding International Application No. PCT/FI2013/050638, dated Sep. 20, 2013, 3 pgs.
International Search report from corresponding International Application No. PCT/FI2013/050639; dated Nov. 27, 2013, 6 pgs.
International Search report from corresponding International Application No. PCT/FI2013/050640, dated Sep. 30, 2013, 3 pgs.
International Search report from corresponding International Application No. PCT/FI2013/050641, dated Sep. 7, 2013, 3 pgs.
Miller, Graeme, Design of Mixer-Settlers to Maximize Performance:, Miller Metallurgical Services, ALTA COPPER-10, May 2006, 26 pgs.
State Intellectual Property Office of the People's Republic of China; Notification of First Office Action issued in application No. 201380037892.6; dated Aug. 31, 2015, Beijing, China.
State Intellectual Property Office of the People's Republic of China, Office Action issued in Application No. 201380034067.0, dated Mar. 3, 2016, 7 Pages, Beijing, China.
State Intellectual Property Office of the People's Republic of China; First Office Action issued in application No. 201380037899.8; dated Oct. 29, 2015; 5 pages; Beijing, China.
State Intellectual Property Office of the People's Republic of China; First Office Action issued in application No. 201380034064.7, dated Nov. 3, 2015; 7 pages; Beijing, China.
State Intellectual Property Office of the People's Republic of China; Notification of First Office Action issued in Application No. 201380034124.5; dated Dec. 16, 2015; 15 pages; Beijing, China.
State Intellectual Property Office of the People's Republic of China, Office action issued in application No. 201380037888.X, dated Dec. 3, 2015, 6 pages, Beijing, China.
Taylor, Alan and Jansen, Malcolm L., "Solvent Extraction Mixer-Settler Design", Intl. Project Dev. Services Ltd., ALTA Free Paper, 10 pgs.
Pending U.S. Appl. No. 14/408,417, filed Dec. 16, 2014.
Pending U.S. Appl. No. 14/407,173, filed Dec. 11, 2014.
Pending U.S. Appl. No. 14/407,187, filed Dec. 11, 2014.
Pending U.S. Appl. No. 14/407,219, filed Dec. 11, 2014.
Pending U.S. Appl. No. 14/408,703, filed Dec. 17, 2014.
Pending U.S. Appl. No. 14/408,711, filed Dec. 17, 2014.
United States Patent and Trademark Office, Office action issued in U.S. Appl. No. 14/407,187, dated Jun. 14, 2016, 8 pages, USPTO, Alexandria, VA.
United States Patent and Trademark Office, Office action issued in U.S. Appl. No. 14/408,703, dated Jun. 14, 2016, 9 pages, USPTO, Alexandria, VA.
United States Patent and Trademark Office, Office action issued in U.S. Appl. No. 14/408,711, dated Jun. 17, 2016, 11 pages, USPTO, Alexandria, VA.
State Intellectual Property Office of the People's Republic of China, Notification of the Second Office Action issued in Application No. 201380034064.7, dated Aug. 15, 2016, 16 pages, Beijing, China.
European Patent Office; Extended European Search Report, issued in European Application No. 13810326.2, dated Sep. 29, 2016; 11 pages; Helsinki, Finland.
Finnish Search report from priority Finnish Application No. 20125716, dated Feb. 27, 2013, 1 pg.
International Search report from corresponding International Application No. PCT/FI2013/050636, dated Oct. 4, 2013, 4 pgs.
European Patent Office; Extended European search report issued in application No. 13809197.0, dated Mar. 21, 2016, 9 pages, Munich, Germany.
R.J. Crawford and M.P. Kearns, Queen's University, Belfast, "Introduction to the Rotational Moulding Process", Practical Guide to Rotational Moulding, 2003, Chapter 1.
Plastic Moulding Process, Jiang Shui Qing, Li Hai Ling, Chemical Industry Publishing House, Aug. 31, 2009, pp. 172-173, Figs 9-11.
International Search Report and Written Opinion from corresponding International Application No. PCT/FI2010/050141, dated Jun. 15, 2010, 6 pgs.

* cited by examiner

METHOD OF MANUFACTURING A SEPARATION FENCE AND SEPARATION FENCE

This is a national stage application filed under 35 USC 371 based on International Application No. PCT/FI2013/050636, filed Jun. 12, 2013 and claims priority under 35 USC 119 of Finnish Patent Application No. 20125716 filed Jun. 26, 2012.

FIELD OF THE INVENTION

The present invention relates to a method of manufacturing a separation fence to be used in a hydrometallurgical liquid-liquid solvent extraction settler. Further, the invention relates to a separation fence.

BACKGROUND OF THE INVENTION

Separation fences are used in a hydrometallurgical liquid-liquid solvent extraction settler to enhance coalescence of the dispersion. In the VSF® technology (stands for Vertical Smooth Flow) developed by the applicant the separation fences are so-called DDG® fences (Dispersion Depletor Gate) (disclosed e.g. in document U.S. Pat. No. 7,517,461).

In prior art, the separation fence is typically manufactured of a fibre-reinforced plastic composite (FRP) by hand laminating. The fence fabricated by hand lamination has many disadvantages. Hand lamination makes the surfaces of the fence, which are in contact with the liquid flow, rough and the edges sharp so that vortices and dead areas are created in the flow. Sharp edges cause unwanted eddies, spouts and jets. This causes scale build-up on flow patterns and the fence is trapping crud. The cleaning of the fence is time-consuming and cumbersome. The liquid flow on the rough surfaces and sharp edges of the fence also causes electrostatic charging which may cause igniting of the flammable atmosphere in the settler. Ignition of the volatile organic compounds (VOC), which are released from the hydrocarbon based solvents, can occur if sufficient electrostatic energy is released in a static discharge. As a manufacturing method of the fence, hand lamination is slow, costly and vulnerable to poor craftsmanship. In hand lamination, also air bubbles may easily remain inside the structure, weakening the fence structure.

OBJECT OF THE INVENTION

The object of the invention is to eliminate the disadvantages mentioned above.

In particular, it is an object of the present invention to provide a method of manufacturing a separation fence and a fence which enable a remarkable reduction in fabrication costs of the fence.

It is also an object of the present invention to provide a method of manufacturing a separation fence and a fence which enable minimizing the local production of unwanted vortices, eddies, dead areas, spouts and jets in the flow when it contacts the surfaces of the fence.

It is also an object of the present invention to provide a method of manufacturing a separation fence and a separation fence which enable minimizing the scale build-up and trapping of crud in the fence, thus also minimizing the time needed for maintenance.

It is also an object of the present invention to provide a method of manufacturing a separation fence and a fence which enable minimizing the VOC emissions and electrostatic charging of the solvents, thus preventing fires in the solvent extraction plant.

SUMMARY OF THE INVENTION

According to a first aspect, the present invention provides a method for fabricating a separation fence to be used in a hydrometallurgical liquid-liquid solvent extraction settler. In the method, the fence is manufactured of a polymer resin material. In accordance with the invention the fence is manufactured as a shell-like integral piece by rotational moulding.

According to a second aspect, the present invention provides a separation fence to be used in a hydrometallurgical liquid-liquid solvent extraction settler, which fence is made of a polymer resin material. In accordance with the invention the fence is a rotationally moulded shell-like integral piece.

Rotational moulding is an established mass-production method which is much more economical than hand lamination. In rotational moulding the manufacturing is performed in a mould. The surfaces of the mould can be made very smooth and all the edges can be rounded so that the fence gets similar characteristics. Therefore, the smooth surface and rounded edges contacting the solvent flow minimize local production of vortices, eddies, dead areas, spouts and jets in the flow when it contacts the surfaces of the fence. Scale build-up and crud trapped in the fence are minimized, as well as the time needed for maintenance. VOC emissions and electrostatic charging of the solvents are minimized, thus minimizing the risk for fires in the solvent extraction plant.

In one embodiment of the method, the method comprises: fabricating a mould composed of two mould halves, comprising a first mould half and second mould half, said mould halves having walls, the inner surface of which corresponds to the outline of the fence; supporting the mould to be rotational about two perpendicular axes; pouring a charge of a polymer resin material powder inside the first mould half; installing the second mould half on the first mould half to close the mould; rotating the mould around the two perpendicular axes; heating the mould while it is rotating around the two perpendicular axes to melt the polymer resin material and to disperse and stick it to the wall of the mould as a layer having a substantially even thickness and forming the fence; stopping the heating of the mould; cooling the mould; opening the mould by separating the mould halves and removing the fence from the mould; and, if needed, performing finishing operations for the fence.

In one embodiment of the fence, the fence has a general shape of a flat rectangular casing having a hollow inner space.

In one embodiment of the fence, the fence comprises a vertical front wall, a vertical rear wall, two vertical side walls, a top wall and a bottom wall. "Front" and "rear" relate to the orientation of the fence when it is installed in the settler in relation to the direction of flow of solvents. The front wall is the wall facing the flow and the rear wall is the trailing wall.

In one embodiment of the fence, the front wall comprises an inlet opening located at the lower part of the front wall, said inlet opening being, in operation, adapted to receive a flow of dispersion to enter the inner space between the front wall and the rear wall, and an outlet opening located at the rear wall at an elevated level in relation to the inlet opening so that, in operation, the dispersion is forced to flow vertically in the inner space between the front wall and the rear wall and out trough said outlet opening.

In one embodiment of the fence, the fence comprises through-channels extending through the fence at the upper part of the fence at a level above the outlet opening.

In one embodiment of the fence, at least one of the front wall and the rear wall comprises outwardly directed bulges extending horizontally along the width of the fence, the bulges thus forming complementary recesses at the inner surfaces of the fence facing the inner space.

In one embodiment of the fence, the polymer resin material comprises carbon fibers. The addition of carbon fibers reinforces the structure and reduces the static electrical charging.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

In the method for fabricating a separation fence 1 to be used in a hydrometallurgical liquid-liquid solvent extraction settler, the fence 1 is manufactured as a shell-like integral piece by rotational moulding.

A mould 2 composed of two mould halves $2^1$, $2^2$ comprising a first mould half $2^1$ and second mould half $2^2$ is manufactured. The mould halves $2^1$, $2^2$ have walls, the inner surface of which corresponds to the outline of the fence 1. Preferably, the mould halves $2^1$, $2^2$ are made of sheet metal, and thus they have a thin metal wall with a good thermal conductivity.

Figure 1:
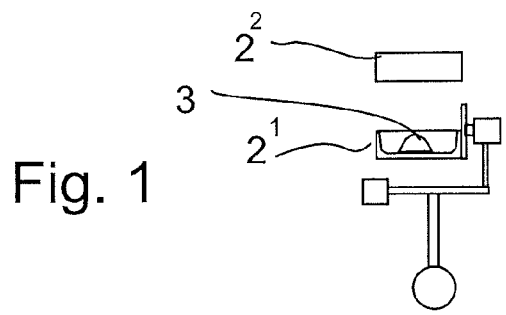
FIGS. 1 to 5 illustrate steps of the rotational moulding of the separation fence in accordance with one embodiment of the invention.
Figure 2:
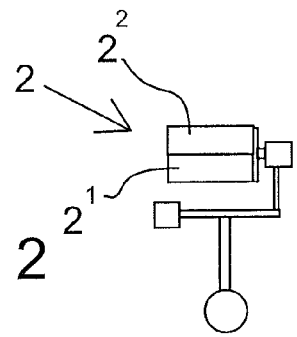

As shown in FIG. 1, the mould 2 is supported in a rotation moulding machine so that the mould is rotational about two perpendicular axes. A charge of a polymer resin material powder 3 is poured inside the first mould half $2^1$. The polymer resin material powder 3 may include suitable additives, such as carbon fibers.

As shown in FIG. 1, the second mould half $2^2$ is installed on the first mould half $2^1$ to close the mould 2.

Figure 3:
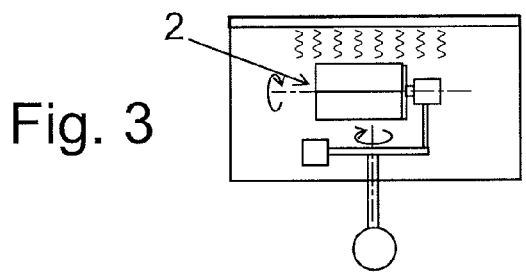

As shown in FIG. 3, the mould 2 is placed into an oven wherein the mould 2 is heated while it is rotating around the two perpendicular axes. The heat melts the polymer resin material. Due to the rotational movement, the melted polymer resin material disperses and sticks to the wall of the mould 2 as a layer having a substantially even thickness and forming the fence 1.

Figure 4:
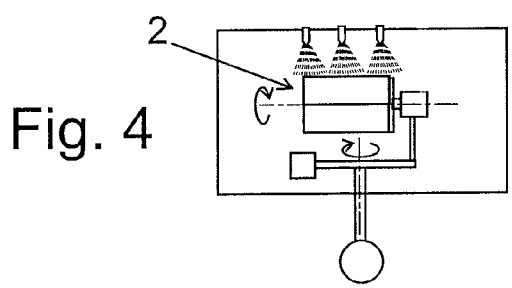

As shown in FIG. 4, after heating, the mould 2 is placed into a cooling station wherein the mould 2 is cooled by spraying a cooling fluid.

Figure 5:
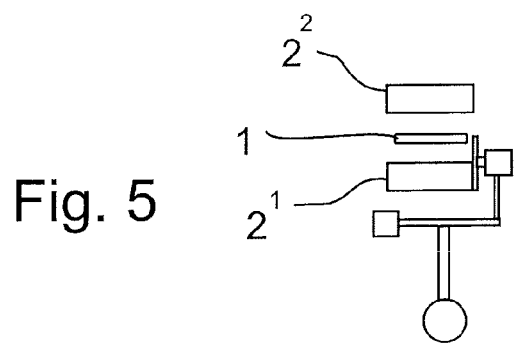

As shown in FIG. 5, after cooling, the mould 2 is opened by separating the mould halves $2^1$, $2^2$ from each other. The fence 1 is removed from the mould.

If needed, finally, finishing operations, such as machining, may be performed on the fence 1.

Figure 6:
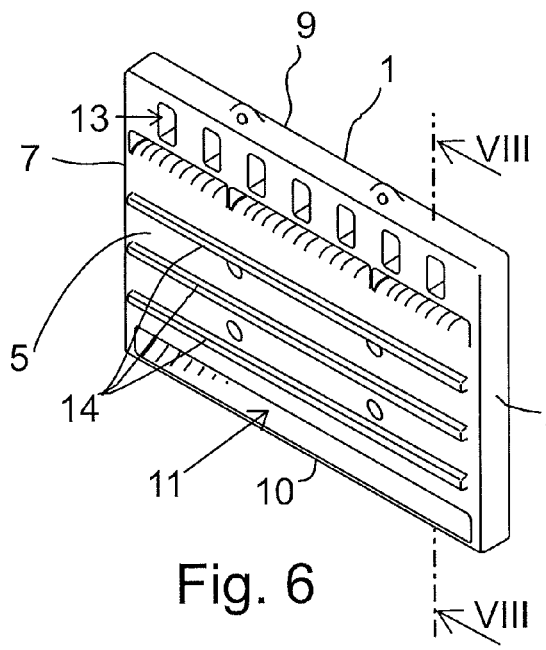
FIG. 6 shows an axonometric view of a separation fence according to one embodiment of the invention seen from the front side and obliquely from above.
Figure 7:
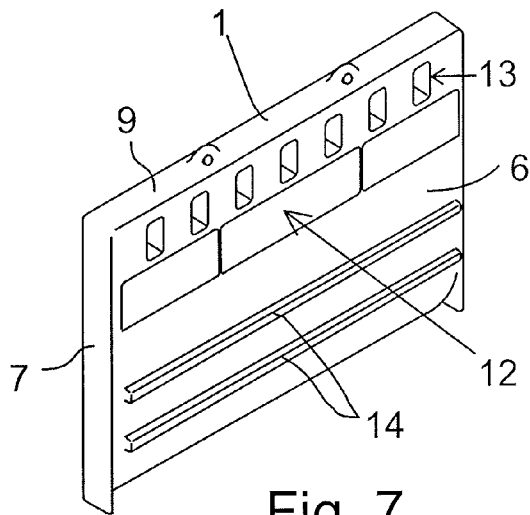
FIG. 7 shows an axonometric view of the separation fence of FIG. 6, seen from the rear side and obliquely from above.
Figure 8:
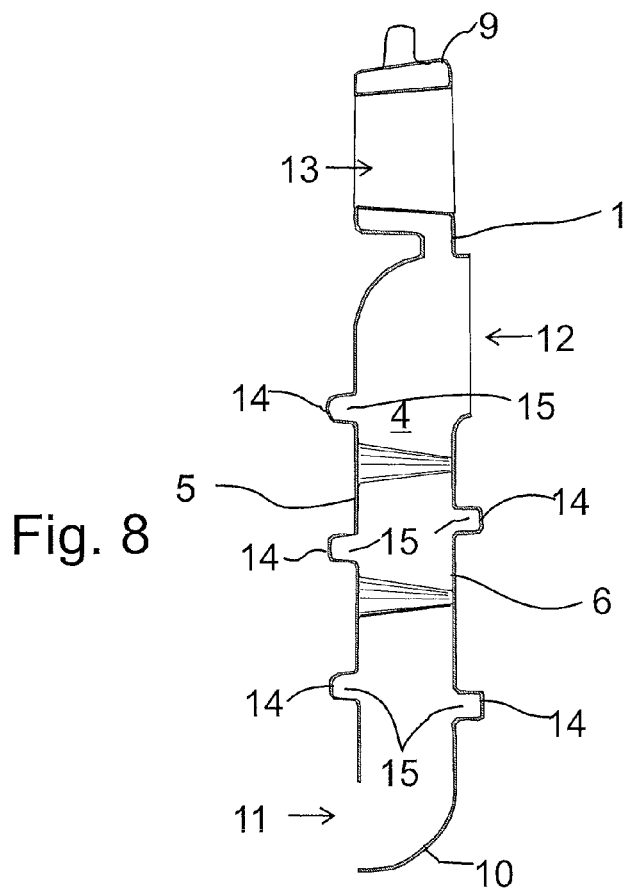
FIG. 8 is a cross-section VIII-VIII of FIG. 6.

FIGS. 6 to 8 show a separation fence 1 to be used in a hydrometallurgical liquid-liquid solvent extraction settler, which fence is made of a polymer resin material.

The fence 1 is a rotationally moulded shell-like integral piece that has a general shape of a flat rectangular casing having a hollow inner space 4. The fence 1 comprises a vertical front wall 5, a vertical rear wall 6, two vertical side walls 7, 8, a top wall 9 and a bottom wall 10.

The front wall 5 comprises an inlet opening 11. The inlet opening 11 is located at the lower part of the front wall 5. In operation, the inlet opening 11 receives the flow of the dispersion which enters the inner space 4 between the front wall 5 and the rear wall 6 and is forced to flow upwards to an outlet opening 12 which is located at the rear wall 6 at an elevated level in relation to the inlet opening 11. In operation, the dispersion is discharged from the inner space trough said outlet opening 12.

At the upper part of the fence 1, at a level above the outlet opening 12, the fence 1 comprises through-channels 13 extending through the fence.

The front wall 5 and the rear wall 6 both comprise outwardly directed bulges 14 extending horizontally along the width of the fence 1. The bulges 14 form complementary recesses 15 at the inner surfaces of the fence facing the inner space 4. In operation, these recesses 15 enhance coalescence of the dispersion.

It is obvious to a person skilled in the art that with the advancement of technology, the basic idea of the invention may be implemented in various ways. The invention and its embodiments are thus not limited to the examples described above; instead, they may vary within the scope of the claims.

The invention claimed is:

1. A method for fabricating a separation fence capable of being used in a hydrometallurgical liquid-liquid solvent extraction settler, in which method the fence is manufactured of a polymer resin material and has a front wall and a rear wall, at least one of the front wall and rear wall defining outwardly directed bulges extending horizontally along the a respective width of the fence, to form complementary recesses on at least one respective inner surface of the fence, characterized in that the fence is manufactured as a shell-like integral piece by rotational molding.

2. The method according to claim 1, characterized in that the method comprises
    fabricating a mold composed of two mold halves, comprising a first mold half and second mold half, said mold halves having walls, the inner surface of which corresponds to the outline of the fence,
    supporting the mold to be rotational about two perpendicular axes,
    pouring a charge of a polymer resin material powder inside the first mold half,
    installing the second mold half on the first mold half to close the mold,
    rotating the mold around the two perpendicular axes,
    heating the mold while it is rotating around the two perpendicular axes to melt the polymer resin material and to disperse and stick it to the walls of the mold halves as a layer having a substantially even thickness and forming the fence, stopping the heating of the mold,
cooling the mold, and
opening the mold by separating the mold halves and removing the fence from the mould.

3. The method according to claim 2, including the step of performing finishing operations on the fence.

4. A separation fence capable of use in a hydrometallurgical liquid-liquid solvent extraction settler, which fence is made of a polymer resin material, characterized in that the fence is a rotationally molded shell-like integral piece and has a front wall and a rear wall, at least one of the front wall and rear wall defining outwardly directed bulges extending horizontally along a respective width of the fence, to form complementary recesses on at least one inner surface of the fence.

5. The fence according to claim 4, characterized in that the fence has a general shape of a flat rectangular casing having a hollow inner space.

6. The fence according to claim 5, further comprising two vertical side walls, a top wall and a bottom wall.

7. The fence according to claim 6, further comprising
an inlet opening located at the lower part of the front wall, said inlet opening being, in operation, adapted to receive a flow of dispersion to enter an inner space between the front wall and the rear wall, and
an outlet opening located at the rear wall at an elevated level in relation to the inlet opening so that, in operation, the dispersion is forced to flow vertically in the inner space between the front wall and the rear wall and out through said outlet opening.

8. The fence according to claim 7, characterized in that the fence comprises trough-channels extending through the fence at the upper part of the fence at a level above the outlet opening.

9. The fence according to claim 7, characterized in that the polymer resin material comprises carbon fibers.

10. The fence according to claim 8, characterized in that the polymer resin material comprises carbon fibers.

11. The fence according to claim 4, characterized in that the polymer resin material comprises carbon fibers.

* * * * *